United States Patent [19]

Mölders

[11] 4,335,871
[45] Jun. 22, 1982

[54] PRESSURIZED FLUID DEVICE

[75] Inventor: Werner Mölders, Plaidt, Fed. Rep. of Germany

[73] Assignee: Stabilus GmbH, Koblenz-Neuendorf, Fed. Rep. of Germany

[21] Appl. No.: 117,658

[22] Filed: Feb. 1, 1980

[30] Foreign Application Priority Data

Feb. 14, 1979 [DE] Fed. Rep. of Germany ....... 2905511

[51] Int. Cl.³ .......................... F16F 9/36; F16F 9/43
[52] U.S. Cl. .......................... 267/64.28; 188/322.21; 141/3; 141/349
[58] Field of Search .......................... 267/64 R, 65 R; 188/269, 322; 141/4, 348, 349

[56] References Cited

U.S. PATENT DOCUMENTS

| Re. 28,329 | 2/1975 | Nicholls | 267/65 R |
|---|---|---|---|
| 3,218,051 | 11/1965 | Doetsch | 267/65 R |
| 3,366,379 | 1/1968 | McNally | 267/65 R |
| 3,827,539 | 8/1974 | Fader | 188/322 |
| 4,044,866 | 8/1977 | Ishida | 188/322 |
| 4,071,057 | 1/1978 | Nagase | 141/4 |
| 4,114,866 | 9/1978 | Kato | 141/4 |
| 4,131,139 | 12/1978 | Tanabe | 141/4 |
| 4,194,731 | 3/1980 | Marx | 267/65 R |

FOREIGN PATENT DOCUMENTS

| 1925963 | 12/1969 | Fed. Rep. of Germany .... 267/65 R |
| 7422901 | 10/1974 | Fed. Rep. of Germany . |
| 925327 | 5/1963 | United Kingdom ............. 267/65 R |
| 993800 | 6/1965 | United Kingdom ............. 267/65 R |
| 1305143 | 1/1973 | United Kingdom ............. 267/65 R |

Primary Examiner—Gregory N. Clements
Attorney, Agent, or Firm—Brumbaugh, Graves, Donohue & Raymond

[57] ABSTRACT

In the illustrative embodiments of the invention described, a pressurized fluid device of the cylinder and piston rod type includes, at one end thereof, an elastomeric closure member which is movable, under the force of the fluid to be introduced into the device, away from a sealing position with respect to the cylinder, and piston rod to a position in which the fluid is admitted into the cylinder for purposes of charging the same. Upon completion of the charging, or fluid-filling, step the closure member is returned to the sealing position either by movement of the piston rod alone or in conjunction with the action of the fluid pressure within the cylinder.

25 Claims, 8 Drawing Figures

PRESSURIZED FLUID DEVICE

BACKGROUND

1. Field of the Invention

This invention relates generally to pressurized fluid devices and, more particularly, to improved structure for introducing pressurized fluid into such devices in a simplified, rapid and reliable manner.

2. The Prior Art

In a device known from German Offenlegungsschrift No. 19 25 963 (see U.S. Pat. No. Re. 28,329), the piston rod is provided with a section of reduced diameter, which section is adapted to be brought into radial alignment with a sealing member fixedly mounted to the container, or cylinder, at the point where the piston rod enters the container, so that the pressurized fluid can pass through a gap between the piston rod and the piston rod passage and across the sealing member. After filling, however, care must be taken that the reduced diameter section of the piston rod does not again come into radial alignment with the sealing member, because in such case the pressurized fluid could escape. Further, the section of reduced diameter must be very carefully machined in order to prevent damage to the sealing member, since the sealing member must prevent leakage of the pressurized fluid during normal operation of the device.

It is further known from German Gebrauchsmuster No. 74 22 901 to fill the container cavity through a gap between the piston rod passage and the piston rod across a lip-shaped sealing member fixed at the piston rod passage, the lip-shaped sealing member acting as a check valve, which opens under the action of an outer filling pressure and sealingly engages the piston rod under the action of the pressure of the fluid within the cavity. Such lip-shaped sealing members must be manufactured very precisely and have a complicated shape, so that their manufacture is expensive. Such lip-shaped sealing members, moreover, must be supported by a supporting member, which must also be shaped very precisely.

SUMMARY

It is an object of the present invention to provide a pressurized fluid device of the type referred to in which the fluid-filling passage is closed by a closure member of simple and inexpensive design. It is further desirable that the closure member be easily maintainable in a filling position before and during the filling operation and also easily be brought into a sealing position with respect to the filling passage after termination of the filling.

In furtherance of these objects, the closure member of the invention is mounted within the container cavity so as to be movable to a filling position remote from the sealing position during filling of the cavity with pressurized fluid and means are provided on the closure member and on the piston rod for moving the closure member towards the sealing position by movement of the piston rod with respect to said container means.

According to a preferred embodiment of the invention, the fluid filling passage is defined by a gap between the piston rod passage and the piston rod, and the closure member is defined by an annular closure member engaging the piston rod and the container at the inner end of the gap during operation of the device. The annular closure member may, in this preferred embodiment of the invention, remain in constant frictional engagement with the face of the piston rod, both in the filling position and in the sealing position, so that no deformation of the closure member in its most sensitive sealing surface, i.e., the surface adjacent and surrounding the piston rod, is necessary during the filling operation. Those parts of the annular closure member that are influenced by the movement of the annular sealing member between the filling position and the sealing position are less sensitive to damage, because they have to fulfill only a static sealing function and not a dynamic sealing function, a dynamic sealing function occurring only between the annular closure member and the piston rod during operation.

If desired, the closure member of the invention may be moved fully to the sealing position by movement of the piston rod. Alternatively, however, the closure member could be moved by the piston rod, after filling, merely to an intermediate position in which the closure member separates a first compartment of the cavity, containing pressurized fluid, from a second compartment of the cavity, which is in communication with the surrounding atmosphere by the filling passage. Once the closure member has been moved to the intermediate position by the piston rod, the closure member will be urged towards the sealing position by the pressure within the first compartment of the container, while expelling the fluid within the second compartment through the filling passage.

According to other advantageous features of the invention, the container wall may be deformed inwardly in the region of the sealing position of the closure member so as to cooperate within and enhance the sealing effectiveness of the closure member. Alternatively, the container wall could be deformed outwardly to define the gas-filling position of the closure member. Again, a separate, resilient member could be provided internally of the container as an aid in sealing the container cavity when the closure member is in the sealing position.

The pressurized fluid device of the invention is useful, for example, as a gas spring or as a hydraulic or pneumatic shock absorber. Further fields of use of the invention will be apparent to those skilled in the art. The pressure of the pressurized fluid may be very high, as e.g. 10 to 100 bar.

BRIEF DESCRIPTION OF THE DRAWINGS

Further objects and advantages of the invention will be apparent from the following description of exemplary embodiments thereof, taken in conjunction with the accompanying drawings, in which.

DETAILED DESCRIPTION

Figure 1:
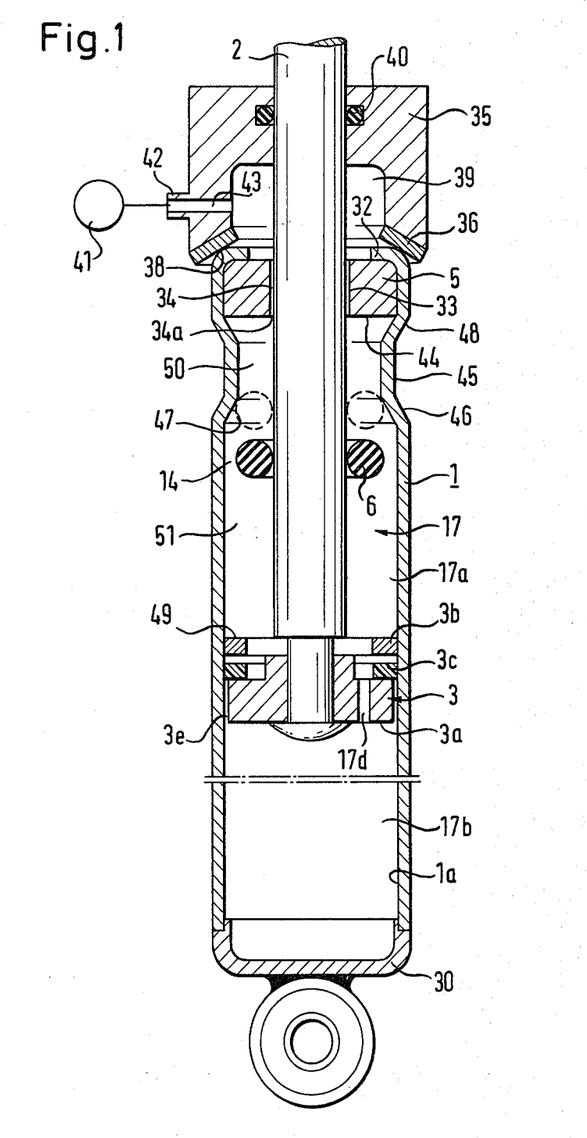
FIG. 1 is a partial longitudinal sectional view of a first embodiment of the invention, showing the parts as they would appear during filling of the cylinder.

In FIG. 1, there is shown a gas spring comprising a cylinder member 1. This cylinder member 1 is closed at one end thereof by an end wall 30 and at the other end thereof by an annular plug member 5. The annular plug member 5 is sealingly mounted within the upper end of the cylinder member 1 by inward rolling of the upper end 32 of the cylinder member 1. A piston rod passage 33 is defined by the annular plug member 5. A piston rod 2 is introduced into a cavity 17 within the cylinder member 1 through the piston rod passage 33, and an annular gap 34 is defined between the outer cylindrical face of the piston rod 2 and the inner cylindrical face of the piston rod passage 33. This annular gap may be extremely narrow, e.g., just as wide as to permit an introduction of pressurized fluid through the gap 34, so that the guiding function of the piston rod passage 33 for the piston rod 2 is not degraded.

At the inner end of the piston rod 2 within the cavity 17 there is provided a piston unit of conventional design which separates the cavity into a working chamber 17a surrounding the piston rod 2 and a working chamber 17b adjacent the end wall 30. This piston unit 3 comprises a piston member 3a, a disc member 3b and a piston ring 3c axially movable between the piston member 3a and the disc member 3b. A flow passage 17d interconnects the working chambers 17a and 17b. The cross sectional area of the flow passage 17d is changed in response to the direction of movement of the piston rod 2 due to the movability of the piston ring 3c between the piston member 3a and the disc member 3b. During outward movement of the piston rod 2 the piston ring 3c is in the position as shown in FIG. 1, in which an annular gap 3e between the piston member 3a and the inner cylindrical face 1a of the cylinder member is closed by the piston ring 3c, so that the flow section through the piston unit 3 is at a minimum. Hence outward movement of the piston rod 2 under the action of pressurized fluid contained within the cavity 17 is damped.

An annular closure member 6 of elastomeric material surrounds the piston rod 2 and frictionally engages the outer cylindrical face of the piston rod 2 in a fluid tight manner. In FIG. 1, the annular closure member 6 is shown in the fluid-filling position. As shown in FIG. 1, the outer diameter of the annular closure member 6 is smaller than the inner diameter of the cylinder wall 1, so that a gap 14 is defined between the annular closure member 6 and the inner cylindrical face 1a of the cylinder wall 1.

In FIG. 1, a fluid-filling head 35 is shown applied to the upper end of the cylinder member 2. The filling head 35 is applied by a sealing ring 36 to the rounded upper edge 38 of the cylinder member 1. A filling chamber 39 is defined within the filling head 35. The filling head 35 is sealed relative to the piston rod 2 by a seal member 40. The filling chamber 39 is connectable to a pressurized fluid source 41 by a filling valve 42 and a filling channel 43. When a pressurized fluid is supplied to the filling chamber 39 the pressurized fluid can enter into the cavity 17 through the annular gap 34. It can pass also around the annular closure member 6 and through the piston unit 3, so that both working chambers 17a and 17b are filled. As will be readily understood, the filling head 35 may be constructed fully to enclose the outer section of the piston rod 2, in which case no sealing member would be necessary.

When the cavity 17 is filled, i.e. when the desired pressure has been achieved, the piston rod 2 is moved upwards as seen in FIG. 1, so that the annular closure member 6 is brought into contact with an inwardly directed terminal face 44 of the annular plug member 5. The inner end 34a of the annular gap 34 is thereby closed by the annular closure member 6, which sealingly engages both the outer cylindrical face of the piston rod 2 and the inwardly directed terminal face 44 of the annular plug member 5. The annular closure member 6 is pressed by the pressure within the cavity 17a against both the outer cylindrical face of the piston rod 2 and the terminal face 44, when the pressure within the filling chamber 39 is removed.

As shown in FIG. 1, the cylinder member is provided with an axial section 45 of reduced inner diameter. The transition between the axial section 45 and the cylindrical main section of the cylinder member 1 is defined by a frusto-conical section 46. This frusto-conical section 46 defines a shoulder face 47. A second frusto-conical terminal section 48 is provided between the axial section 45 and the annular plug member 5. The outer diameter of the annular closure member 6 is equal to or preferably somewhat larger than the inner diameter of the axial section 45.

When the fluid-filling step has been completed, the piston rod 2 is moved upward until the annular closure member 6 engages the shoulder face 47. This upward movement of the annular closure member 6 is achieved by the frictional engagement of the annular closure member 6 and the piston rod 2. If this frictional engagement is not sufficient for moving the annular closure member 6 upwards, the annular closure member 6 will be moved upwards upon engagement with an abutment face 49 of the disc member 3b.

As illustrated in FIG. 1, the annular closure member 6 cannot be brought into direct contact with the terminal face 44 simply by the movement of the piston rod 2, because the disc member 3b engages the shoulder face 47 before the annular closure member arrives at the terminal face 44. When, however, the annular closure member 6 has been brought into sealing engagement with the shoulder face 47 or with the internal face of the axial section 45, no further movement of the annular closure member by the piston rod is necessary. As soon as the annular closure member 6 has arrived in the intermediate position, as shown in dotted lines in FIG. 1, the fluid pressure in the cavity 17 presses the annular closure member 6 upwards after the pressure within filling chamber 39 has been removed. This is due to the fact that the pressurized fluid within compartment 50 can escape through the filling gap 34, whereas the pressurized fluid contained within the compartment 51 below the annular closure member 6 acts on the annular closure member 6. So the annular closure member 6 is moved upwards by the pressurized fluid in the compartment 51 through the axial section 45 and into the terminal section 48. When in the terminal section 48 the annular closure member 6 is in sealing engagement with the terminal face 44. If the outer diameter of the annular closure member 6 is greater than the inner diameter of the axial section 45, the annular closure member 6 is retained in its sealing position by mechanical engagement with the inner face of the terminal section 48. But even if the outer diameter of the annular closure member 6 is equal to the inner diameter of the axial section 45 the annular closure member 6 is maintained in its sealing position by the internal pressure within the cavity 17.

It is evident, therefore, that during the filling action no deformation of the surface area of the annular closure member 6 which is in contact with the outer cylindrical face of the piston rod 2, which surface area fulfills a dynamic sealing action when, in normal operation, the piston rod 2 is axially moved with respect to the cylinder member 1, is necessary.

Figure 2:
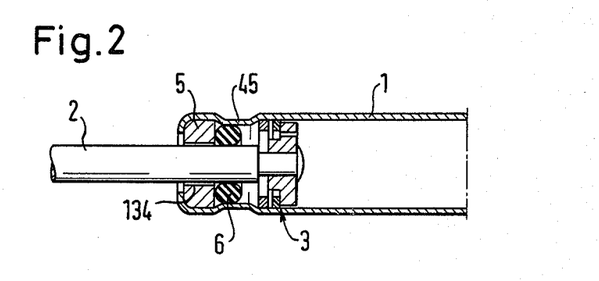
FIG. 2 is a partial longitudinal sectional view of the embodiment of FIG. 1, showing the parts as they would appear during normal operation of the device.

In FIG. 2, the annular closure member 6 is shown in the sealing position. So positioned, the annular sealing member 6 is still in engagement with the axial section 45 of reduced diameter, so that the annular closure member also assists the sealing action between the annular plug member 5 and the cylinder member 1.

Figure 3:
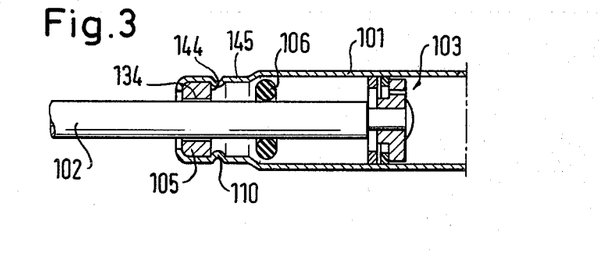
FIG. 3 is a partial longitudinal sectional view, similar to that of FIG. 1, of a second embodiment of the invention, but showing the parts in the cylinder-filling position.

In the embodiment of FIG. 3 analogous parts are designated by the same reference numbers, increased by 100. This embodiment differs from the embodiment of FIGS. 1 and 2 in that the frusto-conical terminal section 48 of FIG. 1 has been replaced by an inwardly directed indentation 110 of the cylinder member 101. In this case the annular closure member 106 may abut the indentation 110, so that the sealing position is defined by said indentation 110, or it is also possible that the elastomeric annular closure member 106 may be compressed to an extent it comes into contact with the terminal face 144 of the plug member 105. The indentation 110 also positions the annular plug member 105 within the cylinder member 101. The fluid filling operation and the accompanying movement of the annular closure member 106 between the sealing and filling positions are performed in the same way as described with respect to FIGS. 1 and 2.

Figure 4:
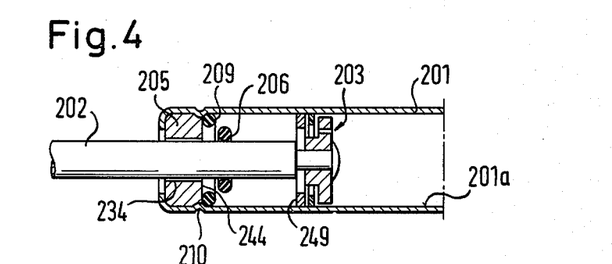
FIG. 4 is a partial longitudinal sectional view of a third embodiment of the invention, showing the parts in the filling position.

In the embodiment of FIG. 4, analogous parts are designated by the same reference numbers as in FIGS. 1 and 2, increased by 200. The fixation of the annular plug member 205 is identical with the embodiment of FIG. 3. The cylinder member 201, however, has a constant inner diameter up to the indentation 210. An annular sealing member 209 is positioned at the identation 210 in sealing contact with the annular plug member 205 as well as with the cylinder member 201. The annular closure member 206 has an outer diameter which is equal to or greater than the inner diameter of the annular sealing member 209. After termination of the filling step, the annular closure member 206 can be brought by the abutment face 249 of the piston 203 into its sealing position with respect to the inner terminal face 244 of the plug member 205 and/or the annular sealing member 209.

Figure 5:
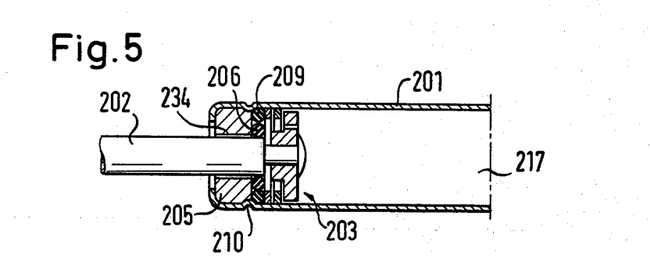
FIG. 5 shows the embodiment of FIG. 4 after filling and ready for normal operation.

FIG. 5 shows the embodiment of FIG. 4 after the annular closure member 206 has been brought into the sealing position. It is clear from FIGS. 4 and 5 that, in this embodiment, the annular closure member 206 can, if desired, be positively moved to the sealing position by the movement of the piston rod 202 and the piston unit 203. But, also, the force of the pressurized fluid in the cavity 217 after the annular closure member 206 has once been brought into sealing contact with the annular sealing member 209 could be relied upon to move the member 206 into the position of FIG. 5.

Figure 6:
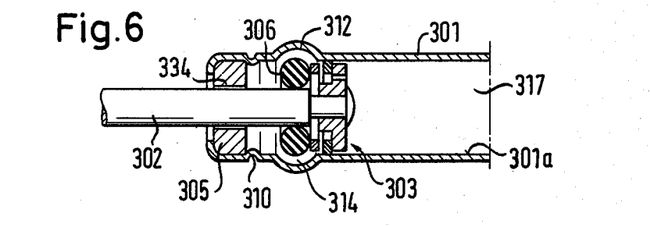
FIG. 6 is a partial longitudinal sectional view of a fourth embodiment of the invention, also showing the parts in the filling position.

In the embodiment of FIG. 6 analogous parts are designated with the same reference numbers as in FIGS. 1 and 2, increased by 300. In this embodiment, there is provided an intermediate section 312 in the container 301, which section has a larger inner diameter as compared with the diameter of the inner cylindrical face 301a. The outer diameter of the annular closure member 306 is equal to the diameter of the internal cylindrical surface 301a and is smaller than the inner diameter of the intermediate section 312, so that a passage 314 is defined in the position of the piston rod 302 as shown in FIG. 6. This is the filling position. The piston rod 302 must be maintained in this position during filling. The filling is also here performed through the annular gap 334. After the filling step has been terminated, the annular closure member 306 is brought by movement of the piston rod 302 and the piston unit 303 into the sealing position shown in FIG. 7.

Figure 7:
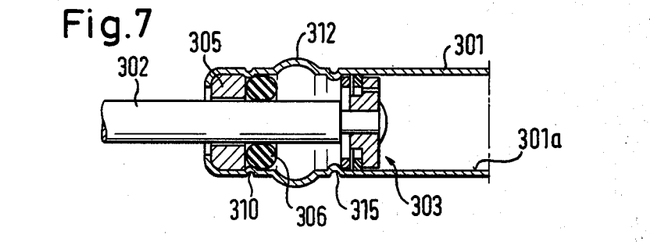
FIG. 7 shows the embodiment of FIG. 6 after filling and ready for operation.

After the annular closure member 306 has been brought into the sealing position of FIG. 7, an annular indentation 315 may be worked in the cylinder member 301 to prevent the piston unit 13 from being brought into radial alignment with the intermediate section 312, thereby preventing the working chambers on the opposite sides of the piston unit 303 from being short circuited by the intermediate section 312. As will be appreciated, the indentation 315 is not necessary if short circuiting of the damping action of the piston unit 303 in the lefthand terminal position of the piston rod 302 is not a problem.

The movement of the annular closure member 306 from the position of FIG. 6 to the position of FIG. 7 can be performed by a leftward movement of the piston rod 302 from the position of FIG. 6. Also, in this embodiment, the fluid pressure in the cavity 317 can move the annular closure member 306 to the sealing position, shown in FIG. 7, when the annular closure member 306 has once been brought into contact with the lefthand end of the intermediate section 312 such that the closure member 306 is in sealing contact with the lefthand end of the cylinder member 301.

Figure 8:
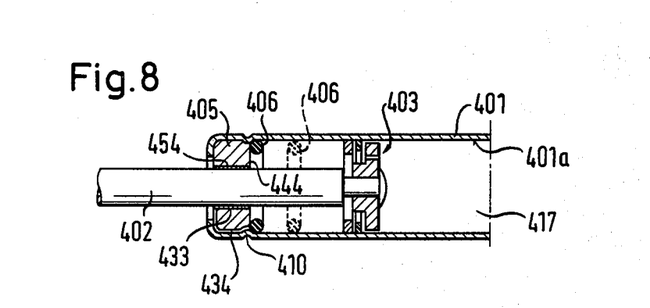
FIG. 8 is a partial longitudinal view of a fifth embodiment of the invention.

In FIG. 8 there is shown a further embodiment. Analogous parts are designated by the same reference numbers as in FIGS. 1 and 2, increased by 400.

In the embodiment of FIG. 8, the piston rod 402 is always in sealing engagement with the piston rod passage 433 by a sealing sleeve 454. The filling passage 434 is provided in this embodiment between the annular plug member 405 and the cylinder member 401. The annular closure member 406 is of elastomeric material and is in frictional engagement with the inner face 401a of the cylinder member 401. The annular closure member 406 is shown in dotted lines in the filling position. In this position pressurized fluid can enter through the gap 434. After filling, the annular closure member 406 is moved to the lefthand position, shown in full lines. This is the sealing position, in which the inner end of the gap 434 is closed. The annular closure member 406 is maintained in sealing contact with the terminal face 444 and the inner cylindrical face 401a by the pressure of the fluid in the cavity 417. The movement of the annular closure member 406 from the righthand filling position to the lefthand sealing position is accomplished by the piston rod 402 and the piston unit 403.

Although the invention has been described and illustrated herein with reference to specific embodiments thereof, it will be understood by those skilled in the art that many modifications and variations of such embodiments may be made without departing from the inventive concepts disclosed. Accordingly, all such modifications and variations are intended to be included within the spirit and scope of the appended claims. It is to be noted that in the embodiments of FIGS. 1, 2, 3, 6 and 7 the closure member 6,106,306, respectively, sealingly engages both the piston rod 2 and the inner face of the cylinder member 1, 101, 301, respectively, when said closure member is in the sealing position. Therefore the closure member fulfills also a sealing function which prevents leakage between the plug member 5 (piston rod guide unit) and the cylinder member 1. When the closure member 6 is in sealing engagement with the piston rod member 2 and with the inner face of the cylinder member 1 when being in its sealing position, it is not necessary that the closure member 6 sealingly engages the terminal face 44 for preventing leakage between the plug member 5 and the cylinder member 1. This means that also in the embodiment of FIG. 3 the closure member 6 can prevent leakage between the plug member 105 and the cylinder member 101 even if the closure member 106 is prevented by the indentation 110 from contact with the inner terminal face of the plug member 105.

If the closure member 6 does not sealingly engage the piston rod member 2 the closure member 6 can prevent leakage between the plug member 5 and the cylinder member 1 only, when the closure member 6 in its sealing position sealingly engages the terminal face 44. It is further to be noted that in all embodiments the closure member 6 is substantially exposed in axial direction to the cavity 17; with other words: there are no separating means provided within the cylinder member 1 for separating the closure member 6 from the cavity 17.

I claim:

1. A pressurized fluid device comprising container means, a cavity defined within said container means, a piston rod passage through said container means, a piston rod having an outer cylindrical face introduced into said cavity through said piston rod passage and movable with respect to said container means, means defining first and second compartments within said cavity, a filling passage in said container means defined at least in part by said piston rod passage and having an inner end adjacent said second compartment for introducing a pressurized fluid into said cavity, an annular closure member carried by said piston rod within said cavity and adapted to be located in a sealing position with respect to said inner end of said filling passage during operation of the device, said annular closure member being movable within said cavity along with said piston rod from a filling position in said first compartment to an intermediate position in which said annular closure member separates said first compartment containing pressurized fluid from said second compartment which is in communication with the surrounding atmosphere by said filling passage, so that after movement of said closure member to said intermediate position by said piston rod the closure member is further moved toward said sealing position by the pressure within said fist compartment while expelling the fluid within said second compartment through said filling passage.

2. A device as set forth in claim 1, wherein said closure member is movable by said piston rod into its sealing position.

3. A device as set forth in claim 1, wherein said closure member is of elastomeric material.

4. A device as set forth in claim 1, wherein said filling passage is defined by a gap between said piston rod passage and said piston rod and wherein said closure member is an annular closure member engaging said piston rod and said container means at the inner end of said filling passage during operation of the device.

5. A device as set forth in claim 4, wherein said gap is an annular gap.

6. A device as set forth in claim 4, wherein said annular closure member is in frictional engagement with said outer cylindrical face of said piston rod, both in said filling position and in said sealing position.

7. A device as set forth in claim 4, further comprising means on said piston rod extending radially beyond said outer cylindrical surface of said piston rod and having a substantially axially directed abutment face for abutment against said annular closure member for moving said closure member toward said sealing position by movement of said piston rod with respect to said container means.

8. A device as set forth in claim 1, wherein said container means comprises a cylinder member having an axis, an inner cylindrical face and closure means at both ends thereof, said piston rod passage extending in axial direction through the closure means at one of said ends.

9. A device as set forth in claim 8, wherein said closure means at said one end comprises an annular plug member having an inner terminal face directed toward said cavity and fixed within said cylinder member and defining said piston rod passage.

10. A device as set forth in claim 4, wherein said annular closure member has a substantially circular cross section, when regarded in a plane containing the axis of said annular closure member.

11. A device as set forth in claim 1, wherein said filling passage has an outer end, said outer end being surrounded by an annular sealing face on said container means for sealingly attaching a pressure fluid filling device.

12. A device as set forth in claim 1, wherein said pressurized fluid comprises a pressurized gas.

13. A device as set forth in claim 1, wherein said pressurized fluid comprised in part by a liquid and in part by a pressurized gas.

14. A device as set forth in claim 1, wherein said piston rod has a constant cross section along its total axial extent, which contacts the piston rod passage both during filling and during operation in all possible positions of said piston rod with respect to said container means.

15. A device as set forth in claim 1, wherein said container means comprises a cylinder member having an axis, an inner face and closure means at both ends thereof, the closure means at one end being defined by a guiding unit inserted into said cylinder member and engaging the inner face of said cylinder member, said piston rod passage extending in an axial direction through said guiding unit, said closure member sealingly engaging the inner face of said cylinder member when being in said sealing position, so as to prevent leakage between said guiding unit and said inner face.

16. A device as set forth in claim 15, wherein said closure member sealingly engages said piston rod member.

17. A device as set forth in claim 15, wherein said closure member sealingly engages a terminal face of said guiding unit directed toward said cavity in a substantially axial direction.

18. A device as set forth in claim 1, wherein said closure member is axially exposed to said cavity.

19. A pressurized fluid device comprising container means, a cavity defined within said container means, a piston rod passage through said container means, a piston rod having an outer cylindrical face introduced into said cavity through said piston rod passage and movable with respect to said container means, a filling passage in said container means defined by a gap between said piston rod passage and said piston rod and having an inner end adjacent said cavity for introducing a pressurized fluid into said cavity, an annular closure member within said cavity which is in a sealing position with respect to said inner end of said filling passage and engaging said piston rod and said container means at the inner end of said gap during operation of the device, wherein said annular closure member is movable within said cavity from said sealing position into a filling position remote from said sealing position during filling of said cavity with said pressurized fluid and wherein engagement means are provided on said piston rod for moving said annular closure member towards said sealing position by movement of said piston rod with respect to said container means, said engagement means comprising an abutment member defined by a part of a piston unit mounted on said piston rod within said cavity and extending radially beyond the outer cylindrical face of said piston rod and having a substantially axially directed abutment face for abutment against said annular closure member.

20. A pressurized fluid device comprising container means, a cavity within said container means, said container means comprising a cylinder member having an axis, an inner cylindrical face, and closure means at both ends thereof, a piston rod passage through said container means, said piston rod passage extending in the axial direction through the closure means at one of said ends, a piston rod having an outer cylindrical face introduced into said cavity through said piston rod passage and movable with respect to said container means, a filling passage in said container means defined at least in part by said piston rod passage and having an inner end communicating with said cavity for introducing a pressurized fluid into said cavity, an annular closure member within said cavity which is in a sealing position with respect to said inner end of said filling passage during operation of the device, wherein said annular closure member is movable within said cavity along with said piston rod from said sealing position into a filling position remote from said sealing position during filling of said cavity with said pressurized fluid, said cylinder member further comprising an axial section near said one end, which axial section has a reduced inner diameter as compared with the inner diameter of said inner cylindrical face, an inner shoulder face being defined at the transition between said axial section and said inner cylindrical face, the outer diameter of said annular closure member being smaller than the inner diameter of said inner cylindrical face and at least as large as the inner diameter of said axial section, said shoulder face defining said an intermediate position of said annular closure member.

21. A device as set forth in claim 20, wherein said inner shoulder face is a substantially frusto-conical face.

22. A device as set forth in claim 20, wherein said container comprises a terminal section between said axial section and said sealing means, said terminal section having a larger inner diameter than said axial section, said annular closure member being housed within said terminal section, when being in its second closed position.

23. A pressurized fluid device comprising container means, a cavity within said container means, said container means comprising a cylinder member having an axis, an inner cylindrical face, and closure means at both ends thereof, a piston rod passage through said container means, said piston rod passage extending in the axial direction through the closure means at one of said ends, a piston rod having an outer cylindrical face introduced into said cavity through said piston rod passage and movable with respect to said container means, a filling passage in said container means defined at least in part by said piston rod passage and having an inner end communicating with said cavity for introducing a pressurized fluid into said cavity, an annular closure member within said cavity which is in a sealing position with respect to said inner end of said filling passage during operation of the device, wherein said annular closure member is movable within said cavity along with said piston rod from said sealing position into a filling position remote from said sealing position during filling of said cavity with said pressurized fluid, said cylinder member further comprising an intermediate section near said one end having a larger inner diameter than said inner cylindrical face, said annular closure member having an outer diameter substantially equal to the inner diameter of said inner cylindrical face, but smaller than the inner diameter of said intermediate section, said annular sealing member being in radial alignment with said intermediate section during filling.

24. A pressurized fluid device comprising container means, a cavity within said container means, said container means comprising a cylinder member having an axis, an inner cylindrical face, and closure means at both ends thereof, a piston rod passage through said container means extending in the axial direction through the closure means at one of said ends and defined by said closure means at said one end, said closure means comprising an annular plug member having an inner terminal face directed toward said cavity and fixed within said cylinder member, a piston rod having an outer cylindrical face introduced into said cavity through said piston rod passage and movable with respect to said container means, a filling passage in said container means defined at least in part by said piston rod passage having an inner end communicating with said cavity for introducing a pressurized fluid into said cavity, an annular closure member within said cavity which is in a sealing position with respect to said inner end of said filling passage during operation of the device, wherein said annular closure member is movable within said cavity along with said piston rod from said sealing position into a filling position remote from said sealing position during filling of said cavity with said pressurized fluid, said device further comprising an annular sealing member provided adjacent the inner cylindrical face of said cylinder member and adjacent the inner terminal face of said annular plug member, said annular closure member having an outer diameter at least equal to the inner diameter of said annular sealing member, said annular closure member being out of contact with said annular sealing member in said filling position and being in contact with said outer annular sealing member in said sealing position.

25. A pressurized fluid device comprising container means, a cavity within said container means, said container means comprising a cylinder member having an axis, an inner cylindrical face, and closure means at both ends thereof, a piston rod passage through said container means, said piston rod passage extending in the axial direction through the closure means at one of said ends, said piston rod passage being defined by said closure means at said one end comprising an annular plug member having an inner terminal face directed toward said cavity and fixed within said cylinder member, a piston rod introduced into said cavity through said piston rod passage and movable with respect to said container means, a filling passage in said container means defined at least in part by said piston rod passage and having an inner end communicating with said cavity for introducing a pressurized fluid into said cavity, an annular closure member within said cavity which is in a sealing position with respect to said inner end of said filling passage during operation of the device, wherein said annular closure member is movable within said cavity along with said piston rod from said sealing position during filling of said cavity with said pressurized fluid, wherein said filling passage is defined by the gap between said cylinder member and the outer periphery of said annular plug member, said annular closure member being in frictional engagement with the inner cylindrical face of said cylinder member and remote from the inner terminal face of said plug member when in said filling position and adjacent said inner terminal face of said plug member when being in said sealing position, the inner diameter of said annular closure member being larger than the outer diameter of said piston rod.

* * * * *

UNITED STATES PATENT AND TRADEMARK OFFICE
CERTIFICATE OF CORRECTION

PATENT NO. : 4,335,871
DATED : June 22, 1982
INVENTOR(S) : Werner Mölders

It is certified that error appears in the above—identified patent and that said Letters Patent is hereby corrected as shown below:

First page, 2nd column, 6th line of ABSTRACT, delete the comma after "cylinder";

Column 7, line 61, "fist" should read --first--;

Column 9, line 66, "container" should read --cylinder member--;

Column 9, line 67, "said sealing means" should read --the closure means at said one end--;

Column 10, line 2, "second closed" should read --sealing--.

Signed and Sealed this

Seventh Day of September 1982

[SEAL]

Attest:

GERALD J. MOSSINGHOFF

Attesting Officer  Commissioner of Patents and Trademarks